No. 666,413. Patented Jan. 22, 1901.
W. J. DUNNACHIE.
METHOD OF CANDYING FRUIT
(Application filed July 18, 1900.)
(No Model.)
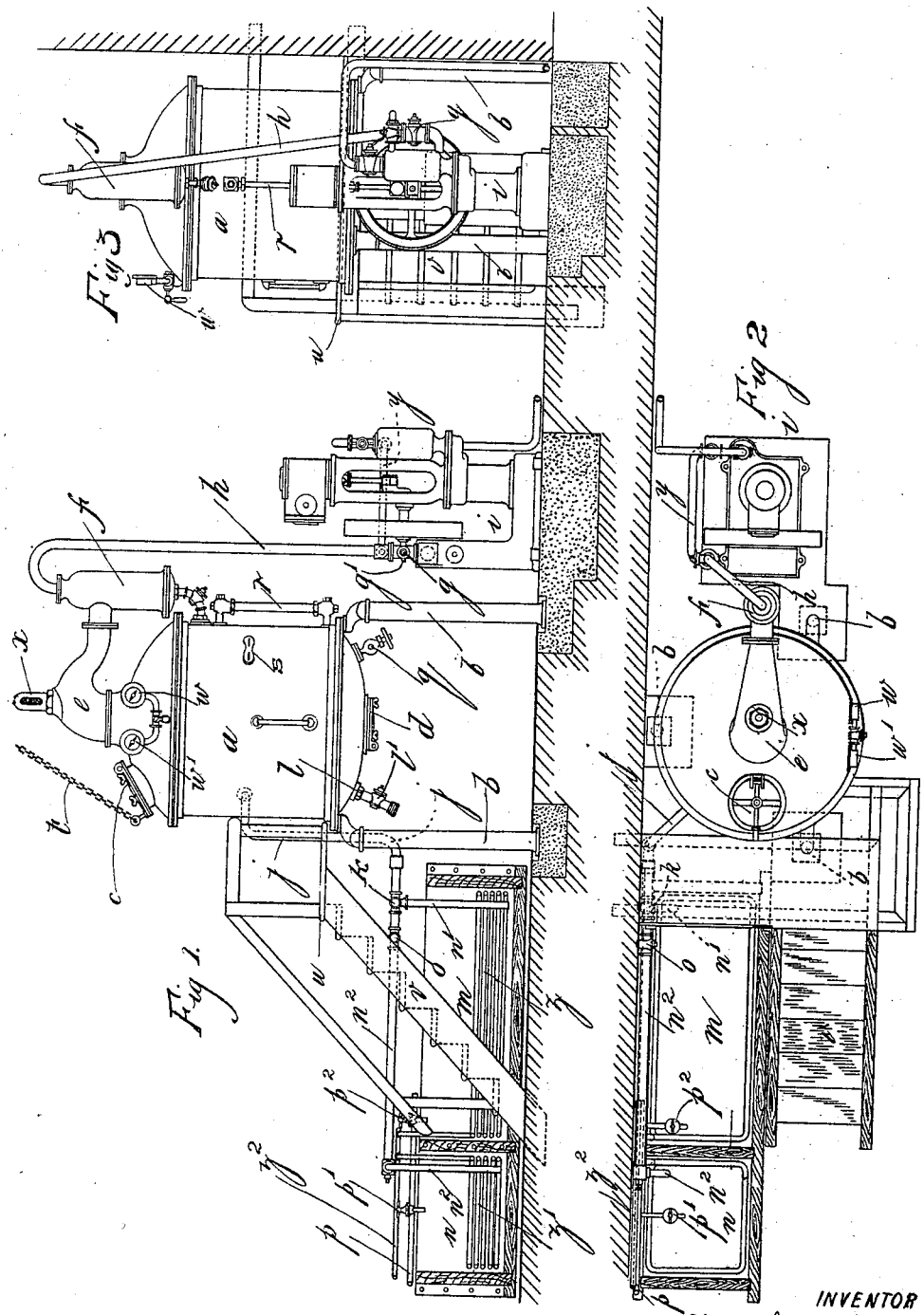
WITNESSES:
Ella L. Giles
Otto Munk
INVENTOR
William James Dunnachie
BY
Richardson
ATTORNEYS
THE NORRIS PETERS CO., PHOTO-LITHO., WASHINGTON, D. C.

UNITED STATES PATENT OFFICE.

WILLIAM J. DUNNACHIE, OF COATBRIDGE, SCOTLAND.

METHOD OF CANDYING FRUIT.

SPECIFICATION forming part of Letters Patent No. 666,413, dated January 22, 1901.

Application filed July 18, 1900. Serial No. 24,069. (No specimens.)

*To all whom it may concern:*

Be it known that I, WILLIAM JAMES DUNNACHIE, a subject of the Queen of Great Britain, residing at the Calder House, Coatbridge, in the county of Lanark, Scotland, have invented a certain new and useful Method of Candying Fruit, of which the following is a specification.

My invention relates to processes in which fruits or parts of fruits are or are not first subjected to the preserving action of brine or solution of salt and primarily or subsequently impregnated with saccharin, syrup, or the like. Hitherto such processes have occupied considerable time and the plant for carrying out the processes has taken up much space.

The object of my invention is by an improved process to shorten the time, minimize the space, and generally to improve the mode of treatment.

To accomplish my object, I employ vacuum involving the use of suitable apparatus, such as is hereinafter described with reference to the drawings annexed thereon.

Figure 1 is a side elevation of the apparatus. Fig. 2 is a plan of the apparatus, and Fig. 3 is an end elevation of the apparatus.

This apparatus consists mainly of a cylindrical or other form of metal or wooden vessel (preferably a copper vessel) $a$, mounted on wood or iron columns $b$. The vessel, as shown, is fixed on the columns $b$. At both ends of the vessel manholes $c\ d$, with suitable doors, are provided for the admission and discharge of the materials to be treated. At the upper end of the vessel a wide pipe or swan-neck $e$ is provided for the egress of the products of evaporation, which in turn connects with a suitable "save-all" $f$ to catch and return any solution which may boil over. Beyond the save-all and at the bottom of the pipe $h$, leading to the condenser and vacuum-pump $i$, is a three-way cock $g$, which can be made to throw the pipe $h$ in communication with the suction side of the cylinder of the vacuum-pump or to cut off the pipe $h$ and throw an air-inlet branch $g'$ into communication with the suction side of the cylinder. In the body of the vessel a smaller pipe $j$, with three-way cock $k$, is fixed for the admission of the solution. A branch $l$, with cock $l'$, is also fixed to the bottom of the vessel for the admission of water or for drawing off the contents of the vessel, as may be desired. A steam-coil, as indicated in dotted lines, similar to that of an ordinary vacuum-pan, is fixed inside the lower end of the vessel. By means of the steam in the coil the contents of the vessel can be raised to the desired temperature.

$q$ is the branch by which the steam enters the coil. It is provided with a screw-down cut-off valve.

The tank $m$ contains the syrup or other solution desired to be used in the curing process, while the tank $n$ contains water, or, if desired, both tanks may contain syrup, which I prefer to use as the curative solution, as I find it gives good effects. The branch pipes $n'\ n^2$ lead from these tanks to the pipe $j$.

$o$ is a stop-cock on the branch $n^2$.

By means of the cock $k$ the pipe $j$ may be thrown into communication with either the branch $n'$ or $n^2$.

$p$ is a water-pipe provided with taps $p'\ p^2$ for filling water into the tanks.

$r$ is a gage-glass, and $s$ is a proof or test stick.

The cover of the charging-door $c$ may be opened by means of a chain $t$ and pulley-block arrangement.

$u$ is a platform for the attendant, and $v$ steps leading to the platform.

$w$ is a vacuum-gage, and $w'$ a pressure-gage.

$x$ is a safety-valve.

$z\ z'$ are steam-coils fitted in the tanks $m\ n$ and supplied with steam by a pipe $z^2$.

The vessel $a$ is provided with a thermometer suitably fitted, as indicated in dotted lines at $z^3$.

The fruits or parts of fruits may be treated by this process directly after the preliminary cooking or other preparatory process to the curing process, or they may be dried or partially dried first.

In carrying out the process—say, for example, for treating orange or other fruit skins—I first prepare a weak saccharine solution or syrup in the tank $m$ by inserting sugar therein and then filling up to the required extent with water supplied through the tap $p^2$. The solution, the strength of which is determined as a matter of experience according to the nature and condition of the skins to be treated, is now heated up to, say, about 90° Fahrenheit by means of the steam-coil $z$, through which steam is passed by the pipe $z^2$ from a boiler or other available source of steam-supply. Water is also run into the tank $n$ and heated by the steam-coil $z'$ to the same temperature as the syrup. The vacuum-pump is now put in operation and a slight vacuum created in the vessel $a$, whereupon the cocks $k\ o$ are opened, so as to allow water to be sucked from the tank $n$ into the vessel $a$ sufficient to cover the charge of orange or other skins, whereupon the cocks $k\ o$ are closed and the vacuum-pump stopped. The skins are now charged into the vessel $a$, and the charging-door having been closed the temperature of the contents is raised to about 100° Fahrenheit by means of the internal steam-coil. Thereupon vacuum is again created in the vessel $a$ and the syrup-cock $k$ opened sufficiently to admit of an inflow of syrup from the tank $m$ exactly equivalent to the rate of evaporation. This operation is continued until the internal syrup attains the requisite concentration, which may be tested in the usual manner by the proof or test stick $s$. At intervals in the above operation the syrup-cock is closed and water introduced to the vessel $a$ instead of syrup in direct proportion to the evaporation. This introduction of water in direct proportion to the evaporation I term "circulation." The frequency and duration of these intervals of circulation is entirely dependent upon the character and condition of the skins undergoing treatment. After the syrup has attained the desired concentration circulation alone is resorted to until the skins are completely and properly cured.

When very thick or hard skins are being treated, I find it an advantage to apply pressure to the skins at intervals. This pressure may be about fifteen pounds to the square inch and may be applied for about half an hour at a time at intervals of about four hours. When it is desired to apply pressure, the water and syrup connections are closed and the three-way cock $g$ turned so as to admit atmospheric air to the suction side of the pump, which air is compressed by the action of the pump and then discharged by the pipe $y$ into the pipe $h$ and from thence into the vessel $a$. The safety-valve $x$ is loaded so as to blow off at fifteen pounds to the square inch. The compressed air in the vessel $a$ acts beneficially on the skins.

The improved process and apparatus are advantageously applicable for treating rinds, peels, or skins—such as those of oranges, citrons, lemons, and the like—also for treating entire fruits, such as cherries, peaches, plums, nectarines, and the like.

After treatment in the manner hereinbefore detailed the fruits or parts of fruits after being discharged from the vessel $a$ may be used for confectionery direct or first candied in the usual manner.

The details of construction of the apparatus are obviously susceptible of variation.

Having now fully described my invention, what I claim, and desire to secure by Letters Patent, is—

The herein-described process of treating fruits or parts of fruits for confectionery purposes consisting in introducing water into the vacuum-chamber, charging the chamber with fruits or part of fruits, raising the temperature to about 100° Fahrenheit, then admitting syrup to the vacuum-chamber in proportion to the rate of evaporation, then causing "circulation" to take place at intervals by introducing water in proportion to the rate of evaporation and during such periods of "circulation" cutting off the supply of syrup, and, finally, when the syrup has attained the desired concentration, admitting water in direct proportion to the evaporation until the fruits or parts of fruits are completely and properly cured.

Signed at Glasgow, county of Lanark, Scotland, this 4th day of July, 1900.

W. J. DUNNACHIE.

Witnesses:
H. D. FITZPATRICK,
WILLIAM GALL.